United States Patent [19]

Pond et al.

[11] Patent Number: 4,864,616
[45] Date of Patent: Sep. 5, 1989

[54] CRYPTOGRAPHIC LABELING OF ELECTRONICALLY STORED DATA

[75] Inventors: Eugene W. Pond, Garland; Jeffrey R. Rush, Richardson; John D. Watson, Carrollton; Bruce A. Woodall, Plano; Walter M. Goode, Dallas; George E. Goode, Richardson, all of Tex.

[73] Assignee: Micronyx, Inc., Richardson, Tex.

[21] Appl. No.: 108,769

[22] Filed: Oct. 15, 1987

[51] Int. Cl.$^4$ ............................................. H04L 9/04
[52] U.S. Cl. .................................. 380/25; 380/24; 380/45; 380/47
[58] Field of Search ............... 380/23, 24, 25, 45–47, 380/49–50

[56] References Cited

U.S. PATENT DOCUMENTS

| | | | |
|---|---|---|---|
| 4,471,163 | 9/1984 | Donald et al. | 380/25 |
| 4,723,284 | 2/1988 | Munck et al. | 380/25 |
| 4,757,533 | 7/1988 | Allen et al. | 380/25 |
| 4,757,534 | 7/1988 | Matyas et al. | 380/25 |
| 4,757,536 | 7/1988 | Szczutkowski et al. | 380/48 |

Primary Examiner—Salvatore Cangialosi
Attorney, Agent, or Firm—Richards, Harris, Medlock & Andrews

[57] ABSTRACT

A method of cryptographically labeling electronically stored data is provided as part of a security system for personal computers. In protecting sensitive files of data, the labeling method utilizes a plurality of key streams, which are long, relatively prime-length sequences of random-like bytes. The key streams are related in some way to individual user and machine identifiers. Protected files of data are encrypted and decrypted by combining the key streams with the data using a reversible function, such as Exclusive OR. Each protected file has a label prefixed to it as part of the file. The label contains information necessary for encrypting and decrypting the file, controlling access to the file, and verifying integrity of the label and file. The label is permanently prefixed to the protected file but is encrypted and decrypted separately from encryption and decryption of the file.

12 Claims, 3 Drawing Sheets

CRYPTOGRAPHIC LABELING OF ELECTRONICALLY STORED DATA

TECHNICAL FIELD

This invention relates to the protection of sensitive information stored in electronic data processing systems and, in particular, to a method of cryptographically labeling data as part of a security system for personal computers.

BACKGROUND OF THE INVENTION

The tremendous success of personal computers ("PCs") has brought significant changes to the field of electronic data processing. Large numbers of PCs have been sold to small businesses as entry level systems to be operated as stand-alone computers. However, even greater quantities of PCs have been sold to major organizations in both the public and private sectors for use as intelligent workstations in sophisticated data processing networks. These PC networks have led to the development of electronic highways which allow data to be transported easily and quickly from one workstation to any other workstation in the network. The driving force for this rapid development of widespread PC networks has been the potential of increased business productivity.

As PC networks have increased in size, data processing managers have discovered that each PC in the network is more than merely an intelligent workstation. In a network, each PC is really a general-purpose computer having access to a vast array of stored electronic data. The problem is that each individual PC in a network has no significant data security, transaction audit, or management control features built into the workstation. As a consequence, the integration of large arrays of PCs into data communications networks is causing serious problems in the areas of network management, data integrity, data security, and financial management. These problems arise because storing information in a PC network is equivalent to storing information in an unlocked filing cabinet. An individual using a PC workstation can view all the data in the PC and much of the data in the PC network, can change or retrieve any data desired, and can make copies of any file, all without leaving evidence of what transactions were accomplished.

In response to these recognized security problems, organizations have taken two basic approaches. As a first approach, administrative strategies such as procurement policies and procedures have been used to slow the uncontrolled expansion of PC networks. This solution, however, has been unsuccessful due to the relatively low cost of PC hardware, the multiplicity of distribution channels for PCs in the marketplace, and the ease of connecting additional PCs to an existing network. As a second approach, many organizations have tried to implement technical solutions to safeguard their electronic data bases. These solutions include various software systems presently available in the marketplace, such as "Knight Data Security Manager" by AST Research, Inc. and "Watchdog" by Fischer Innis Systems Corp. However, none of these solutions has been totally acceptable because of the nature of PC operating systems, which are single-user operating systems wherein the user effectively controls all the system resources. As a result, any security measures based on typical PC operating systems can be circumvented. Security systems involving hardware as well as software are available, but the present products have fallen short of the functional requirements for stand-alone PCs, and they have not been designed to be integrated into the data processing networks found in most large organizations.

The United States Government has taken an aggressive stand on electronic data processing security as reflected in National Security Decision Directive 145. This Executive Order, signed on Sept. 17, 1984, requires all government data processing and telecommunications installations to be secure. In addition, the United States Congress passed the Computer Fraud Act of 1984 to address the problem of computer crime, and the Department of Defense ("DOD") has been actively evaluating computer products designed to meet the stringent security requirements of the government.

In the private sector, the growth of PC workstation networks has slowed down significantly. Local area networks are no longer being eagerly installed, and the connection of additional PCs to existing networks is being resisted by data processing managers who are unable to control PCs once they are connected in the network. This slowdown in the private sector is simply the result of escalating costs associated with the problems of data base security. In some cases these costs have begun to exceed the benefits attributable to the use of PC networks.

As a result of these serious problems associated with electronic data processing security, there is a tremendous need for a PC security system which provides network management control, data base integrity, and transaction audit features that allow security managers to trace individual user actions. However, any new PC security system should be designed to meet the needs of the marketplace, which include the following constraints: U.S. Government specifications, such as the Trusted Computer System Evaluation Criteria, for DOD approved secure computing equipment; private sector data processing requirements that the system provide asset management, network management, financial accountability, software compatibility, and no loss of business productivity; software vendor requirements that the system respect the integrity of the vendor's proprietary data structures, algorithms, and user interface; hardware vendor requirements that the system perform within the constraints of the hardware's input/output systems, operating systems, and interface technology; and product marketing requirements that the security system meet the needs of a broad spectrum of customers and also remain inexpensive to sell and maintain.

SUMMARY OF THE INVENTION

The present invention is a method of cryptographically labeling data to provide security for sensitive information during storage in electronic data processing systems. This labeling method was developed to be utilized as part of a total security system designed especially for personal computers. The overall security system, of which the present invention is a distinct element, may include circuitry that is installed in an expansion slot of the PC. By utilizing resident software, such a system can provide protection for sensitive data stored in the PC as well as protection for data accessible through another PC in a network. The system may include a secure memory and a data ciphering processor for encrypting and decrypting sensitive data. A significant advantage of the present invention is that it provides a high level of encryption at a high speed without using high-cost dedicated encryption hardware.

The present invention protects sensitive data stored in a PC by encypting the data using two or more key streams. Data is encrypted utilizing a Mandatory (or Master) Key Stream and at least one other key stream which is based on the identification of a particular machine or group of machines and/or a particular user or group of users. During installation of a PC security system, a machine identifier ("MID") may be assigned to the individual PC. In addition, the PC may be assigned a Configuration ID ("CID") at the time the PC is connected and configured as part of a personal computer network. Also, individual users may be assigned a unique Primary ID ("PID") and/or a Secondary ID ("SID") that is common to a group of individuals.

The various machine and user IDs are utilized to generate 8-byte random-like binary keys which may be stored in the secure memory. Alternatively, the binary keys may be furnished or generated by the user or generated by any other means. At log-on, each key is used to generate a key stream, which is a long, relatively prime-length sequence of random-like bytes. As a result, a plurality of key streams may be generated and used for encrypting data, wherein each key stream is related in some way to the identification of the individual user and/or the individual PC. The use of a plurality of key streams (e.g. the Mandatory Key Stream plus one or more optional key streams) results in a total key stream having an effective length equal to the product of the lengths of the individual key streams, thus producing a high level of encryption without the requirement of large storage capacity for extremely long streams.

Files of data which are to be entered into the PC and protected by encryption are given a file label that is prefixed as a part of the file. The file label comprises the following fields: a Banner, a Label Size, a Key Mix, an Access Check, an Initialization Vector, and a Checksum. Other fields may be included to provide general system functions or to provide additional control of the encryption process. The Banner is not encrypted and simply announces that the file is protected. The Label Size indicates the number of bytes in the label. The Key Mix is utilized to designate which keys, in addition to the Mandatory Key, are to be used for encryption and decryption of the protected file. The Access Check comprises a constant sequence of characters encrypted through the key streams indicated in the Key Mix. Successfully decrypting the Access Check confirms that a requesting user is qualified to access the protected file. The Initialization Vector contains bits for indicating the starting byte in each of the key streams used for encryption and decryption. The Checksum is derived by summing the Label Size, the Key Mix, the Access Check, and the Initialization Vector and is used to confirm the integrity of the label. The Checksum is also used as the initialization vector for the Mandatory Key Stream, which is used to encrypt and decrypt the Key Mix, Access Check, and Initialization Vector fields of the label.

Data is encrypted and decrypted by combining a key stream with the data using a reversible function, such as Exclusive OR. The data is encrypted at least twice: first by using the Mandatory Key Stream and then once for each of the ID key streams designated in the Key Mix. When the label is generated, the Initialization Vector ("IV") field is filled with random bits. The random IV bits are used by the data ciphering processor to indicate the starting point for each key stream. In addition, the IV field may contain bits that indicate which of several reversible functions is to be used for encryption and decryption of the file and the direction in which the key streams are to be applied. These options provide additional levels of randomness in the encryption process. When the end of a key stream is reached during encryption or decryption, the ciphering processor simply returns to the beginning of the key stream and continues until the file has been completely encrypted or decrypted. As stated above, after the file label has been generated, the Key Mix, Access Check, and Initialization Vector fields of the label are encrypted using the Mandatory Key Stream and the Checksum as the initialization vector. Thus, much of the data necessary to decrypt an encrypted file is attached permanently to the file but is itself encrypted using the Mandatory Key Stream.

When a user attempts to access a protected file, the ciphering processor decrypts the file label using the Mandatory Key Stream and the Checksum as the initialization vector. After decryption of the label, the Label Size, Key Mix, Access Check, and Initialization Vector fields are summed and compared with the Checksum to verify that the label has not been tampered with. Next, the Access Check of the label is compared to an access code generated by encrypting a constant sequence of characters according to the logged-on user and machine IDs and the Key Mix specified in the label. If the Access Check does not match the logged-on user's access code, access to the file is denied. If the Access Check matches, access to the file is granted and, thereafter, all reads from and writes to the file are encrypted and decrypted in a manner transparent to the user.

BRIEF DESCRIPTION OF THE DRAWINGS

For a more complete understanding of the present invention and for further advantages thereof, reference is now made to the following Description of the Preferred Embodiments taken in conjunction with the accompanying Drawings, in which.

DESCRIPTION OF THE PREFERRED EMBODIMENTS

The present invention provides a method for controlling access to sensitive files of data stored in a computer by cryptographically labeling the protected files. As referred to herein, a data file is a logical sequence of bytes (each byte comprising 8 bits (1 or 0)) recognized as a unit by a computer. A data file is accessed by the computer's operating system whenever a subject, which may be an individual user or a program, opens the file in order to read from or write to the file.

A common technique for controlling access to sensitive files is to encrypt the data so that it appears unreadable to a subject. Encryption of data provides a high level of protection even if the data storage medium is physically stolen.

The method of the present invention protects a file through encryption and allows only certain users to access the file thereafter. When the computer confirms and grants access to a protected file, the file is automatically decrypted when read from and encrypted when written to in a manner that is transparent to the user.

The method of the present invention utilizes a file label, or prefix of bytes, that is attached to the file and contains information regarding encryption of and access to the file. The present invention may be used with any computer system and in conjunction with other data security methods and devices. The present invention requires a data ciphering processor, which is well known in the art and can comprise hardware and/or software, and the preferred embodiment utilizes a secure region of the computer's memory.

The present invention utilizes at least the following four clear text (i.e. not encrypted) identifiers ("IDs"):

(1) a Machine ID ("MID") comprising a data string uniquely identifying each personal computer (e.g. a location name);

(2) a Configuration ID ("CID") comprising a data string identifying the PC as part of a particular configuration in a PC network (e.g. a company name);

(3) a Primary ID ("PID") comprising a data string uniquely identifying an individual user logged-on to the PC (e.g. a user's name); and (4) a Secondary ID ("SID") comprising a data string identifying a logical group of users of which the user logged-on to the PC is a member (e.g. a department name).

Corresponding to each of these clear text IDs is an 8-byte key, which may be supplied by the computer owner or generated by the computer as a function of the IDs. A key is a bit pattern which is used in the encryption process and which may be stored in a secure portion of the PC's memory. In addition to the keys for the IDs, there is a Mandatory Key which is stored in the secure memory of each PC utilizing the method of the present invention.

Figure 1:
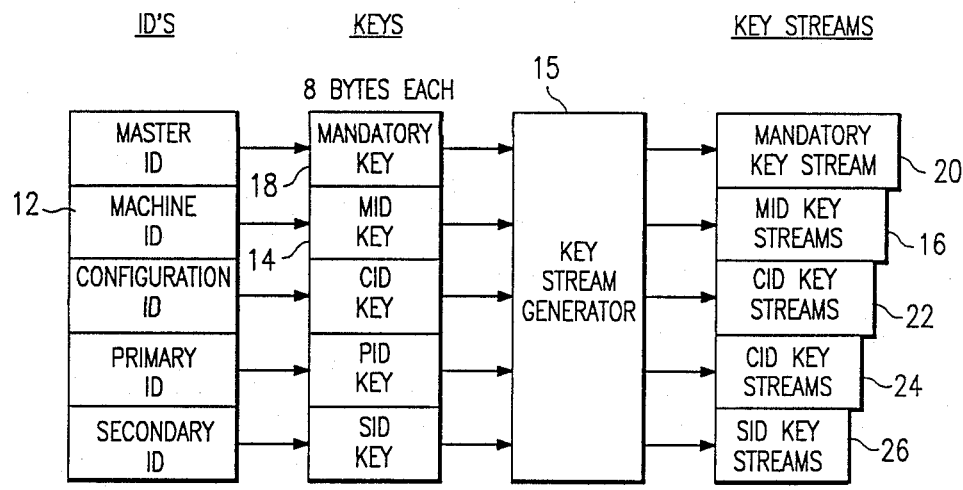
FIG. 1 is a block diagram showing the relationship between the machine and user identifiers and the keys and key streams of the present invention.

Referring to FIG. 1, the relationship between the IDs, Keys, and Key Streams is illustrated in a block diagram. For each identifier, such as the Machine ID 12, a corresponding random-like number, such as the MID Key 14, is generated. Each of the keys, such as the MID Key 14, is utilized to seed a key stream generator 15 to generate a key stream such as the MID Key Stream 16. In addition to the keys associated with the machine and user IDs, the preferred embodiment includes a Mandatory Key 18 which is used as a seed to generate a Mandatory Key Stream 20. The Mandatory Key Stream 20, the MID Key Stream 16, the CID Key Stream 22, the PID Key Stream 24, and the SID Key Stream 26 each comprise a long, relatively prime-length sequence of random-like bytes with each key stream having a different length.

The key streams are used by the ciphering processor to encrypt clear text and to decrypt encoded text. The key streams are combined with the text on a bit-by-bit basis using a reversible function, such as Exclusive OR or Exclusive NOR, so that the same key stream can be applied once to encrypt a string of clear text bytes and then applied a second time to decrypt the encoded text. To enhance the security provided by this method of encrypting information, the preferred embodiment generally utilizes at least two key streams to encrypt the text. Furthermore, the key streams comprise long, relatively prime-lengths of bytes, and a randomizing function is used to generate the bytes to populate each key stream.

Figure 2:
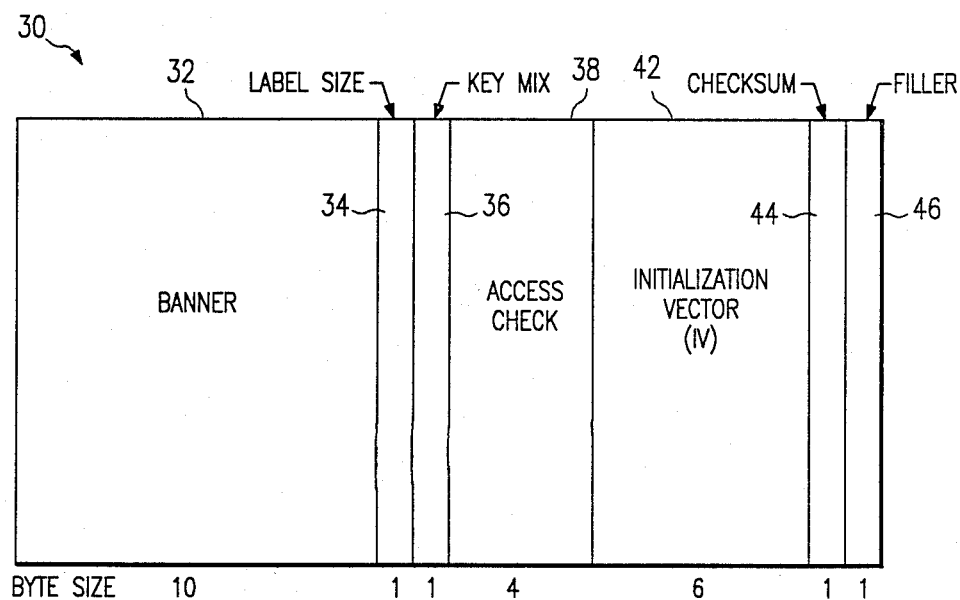
FIG. 2 is a block diagram showing the various fields of the file label of the present invention.

In order to provide instructions for encrypting and decrypting sensitive information, the method of the present invention utilizes a file label that is prefixed to the file. Referring to FIG. 2, label 30 is illustrated in block form to show the length in bytes and the position of the various fields of the label 30. The Banner 32 is a 10-byte field at the beginning of the label 30 that contains the clear text announcement "Protected". The Label Size 34 is a 1-byte field that indicates the length of the label 30. The Label Size 34 is included in the label 30 to allow for various modifications to the length and contents of the label 30. The remaining fields of the label 30 include a Key Mix 36 (1 byte), an Access Check 38 (4 bytes), an Initialization Vector 42 (6 bytes), a Checksum 44 (1 byte), and a filler 46 (1 byte) that is used to align the label 30 on a 2-byte boundary of the file.

The Key Mix 36 is a single byte containing five bit flags. One of the bits is a Label-is-Present flag which indicates whether the label 30 is to be considered present on the protected file. The Label-is-Present flag may be disabled temporarily to allow an encrypted file to be transferred (between PCs having the same configuration) as if the file were not encrypted. The remaining four bit flags of the Key Mix 36 are used to designate which of the optional key streams 16, 22, 24, 26 are to be used to encrypt or decrypt the file. At least one of the key stream flags of the Key Mix 36 must be set or else the file will not be encrypted and the label 30 will not exist.

When a protected file is created, it is always encrypted under the Mandatory Key Stream 20. In addition, the creator of the file selects which of the optional keys are to be used for encryption, thereby setting the bit flags of the Key Mix 36. The Key Mix 36 is included as a field in the label 30 attached to the protected file to enable decryption of the file using the key streams designated by the Key Mix 36. Based on the Key Mix 36 designated during creation of the protected file, the file can only be decrypted as follows:

(1) If MID is selected, the file can be decrypted only on the PC on which it was encrypted;

(2) If CID is selected, the file can be decrypted only on a PC sharing the same security configuration with the PC on which the file was encrypted;

(3) If PID is selected, the file can be decrypted only by the same user who encrypted the file; and (4) If SID is selected, the file can be decrypted only by a user in the same group as the user who encrypted the file.

The data entered into the protected file is first encrypted under the Mandatory Key Stream and then under each of the other key streams designated by the Key Mix 36. Thus, the restrictions indicated above can be combined. For example, if MID and SID are both used to encrypt a file, then only a user in the same user group (i.e. a user having the same SID) who is logged-on to the same PC as the one on which the file was encrypted may read the protected file.

The Access Check 38 comprises 4 bytes of constant data which are encrypted according to the keys designated by the Key Mix 36. For example, if the Key Mix 36 designates MID and SID, the Access Check 38 may comprise four characters (such as the word "TEXT")

combined by a reversible function (such as Exclusive OR) with the MID and SID key streams.

The primary purpose of the Access Check 38 is to confirm that a user requesting access to a protected file is qualified to access that file. An access code is generated for the requesting user in the same manner that the Access Check 38 was generated during creation of the protected file. The requesting user is granted access to the protected file only if the Access Check 38 of the label 30 attached to the protected file is the same as the access code generated for the requesting user.

A secondary purpose of the Access Check 38 is to allow a Security Manager to decrypt an encrypted file having an unknown owner. The Security Manager is able to compare the Access Check 38 with combinations of known keys (i.e. known to the Security Manager) combined according to the Key Mix 36 to determine the correct key streams to use to decrypt the file. The Initialization Vector ("IV") 42 is populated during creation of a protected file by filling the IV field 42 with random or pseudo-random bits. The bits of the IV 42 are used to indicate a starting byte for each of the key streams utilized for encryption or decryption. The IV 42 may also include bits used to indicate the particular reversible function (such as Exclusive OR or Exclusive NOR) and the directions in which the key streams are applied for encryption and decryption of that particular file. The options of randomly determining which direction and which reversible functions are used for encryption and decryption provide additional levels of randomization in the encryption process.

The Checksum 44 is a single, byte comprising a sum of the Label Size 34, the Key Mix 36, the Access Check 38, and the IV 42. The Checksum 44 is used to detect tampering with the label and is also used as the initialization vector for encrypting the Key Mix 36, Access Check 38, and IV 42 using the Mandatory Key Stream 20.

Figure 3:
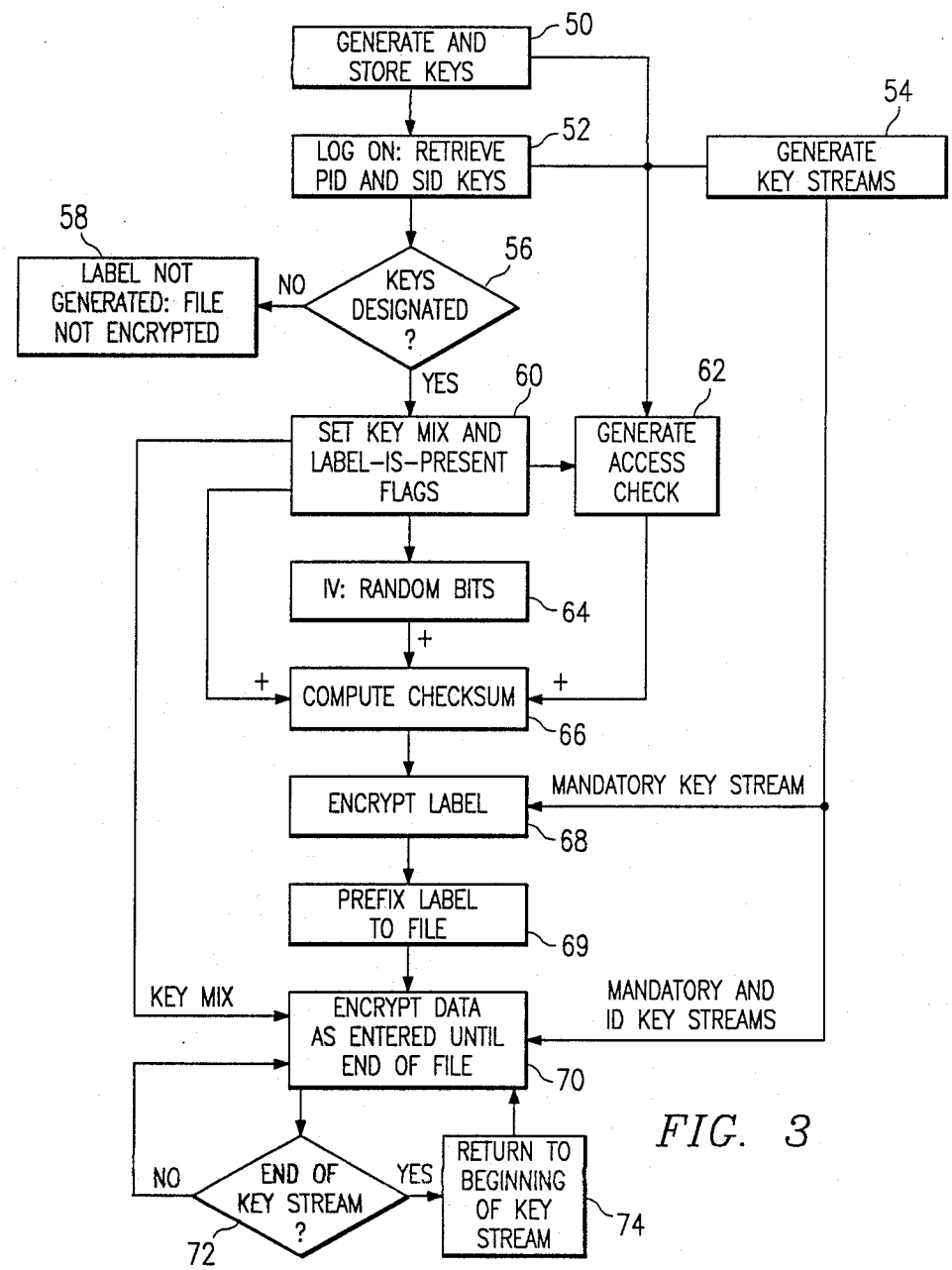
FIG. 3 is a logic diagram showing the encryption of a label and data file using the method of the present invention.

The method of generating a file label and encrypting a protected file is illustrated in the logic diagram of FIG. 3. The first step is to generate and store the Mandatory, MID, and CID Keys, as indicated in block 50. The Mandatory and MID Keys are generated and stored at the time a security system is installed in the PC. The PID, SID, and CID Keys are generated and stored at the time the PC is configured as part of a PC network. These keys may be specified by the system installer or may comprise random or pseudo-random bits. After log-on 52, which is a sequence whereby the user is identified to the computer, the Mandatory and ID Keys are used to seed the key stream generator 15 to generate the respective key streams, as indicated in block 54. If the user initiates the creation of a file, the system looks to see if the user has designated any of the optional keys for encryption of the file, as shown in block 56. The designation of encryption keys 56 may be accomplished manually by the user or automatically in accordance with preprogrammed instructions. If no encryption keys are designated, either manually or automatically, a file label is not generated and the file is not encrypted, as shown in block 58. If one or more optional encryption keys have been designated, the Key Mix and the Label-is-Present flags are set in the Key Mix field 36 of the label 30, as indicated by block 60. The ID Keys flagged by the Key Mix 36 are used to generate the Access Check, block 62. After the Key Mix flags have been set 60, the Initialization Vector is filled with random bits, as indicated by block 64. The Label Size, the Key Mix, the Access Check, and the IV are summed to compute the Checksum the Label Size 34 is predetermined and added to the Key Mix 36 Acess Check 38 and W42 , as shown by the three arrows entering block 66. After the Checksum has been computed 66, the Key Mix, the Access Check, and the IV fields of the label 30 are encrypted using the Mandatory Key Stream and the Checksum as the initialization vector, as indicated by the arrows entering block 68. Next, the label is prefixed to the file, as indicated by block 69. Thereafter, all data entered into the file is encrypted, block 70, using the Mandatory Key Stream and the ID Key Streams designated by the Key Mix 36. Each byte of data is encrypted under each of the designated keys until the end of the file is reached. If the end of a key stream is reached before the end of the file, block 72, encryption of the data continues by returning to the beginning of the key stream, as shown by block 74. The encryption of the entire file is accomplished in a manner that is transparent to the user.

Figure 4:
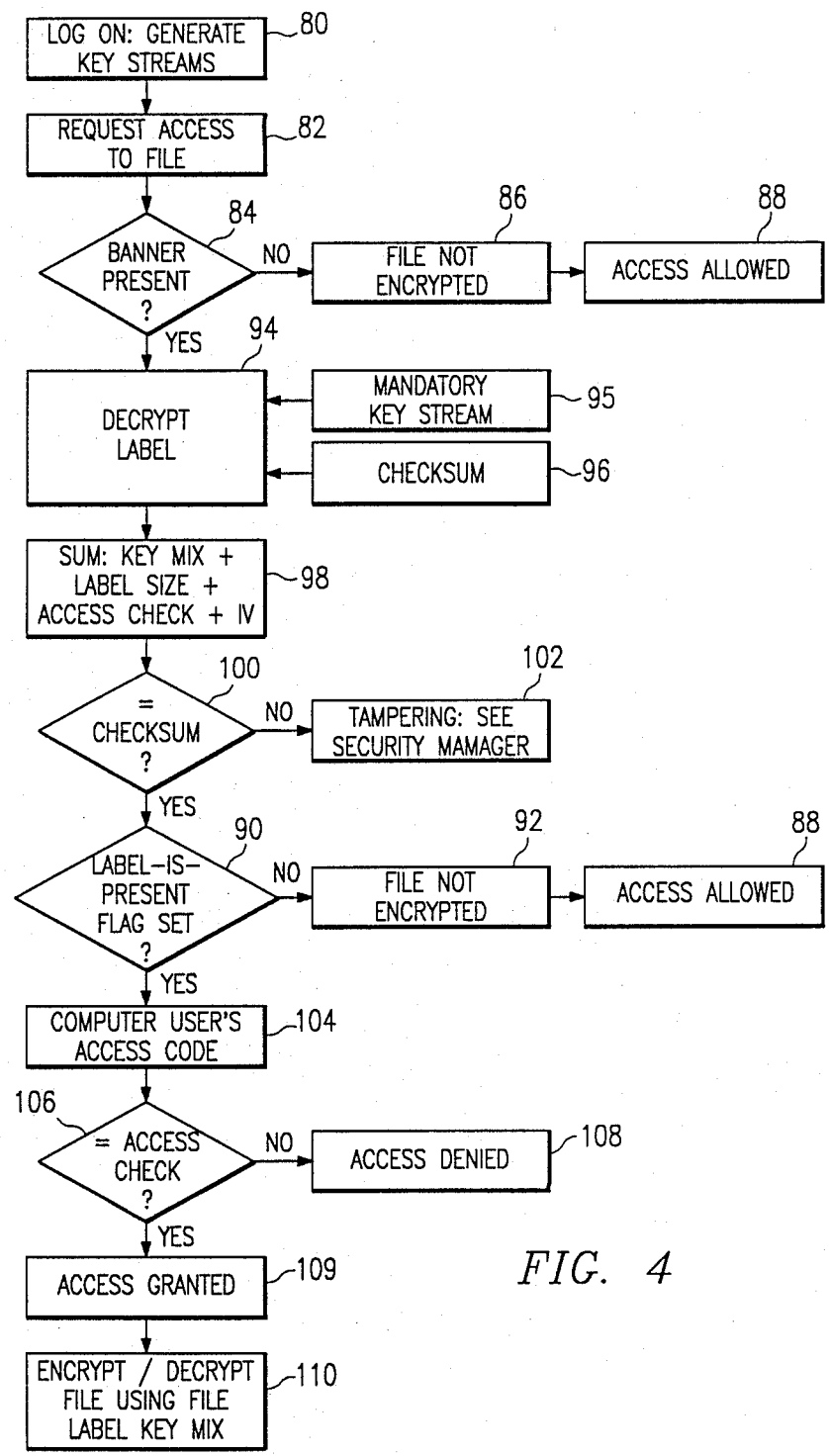
FIG. 4 is a logic diagram showing access control and decryption of a protected file of data using the method of the present invention.

Once a protected file has been stored in the PC or PC network, the file is protected from access by unauthorized users. As illustrated in the logic diagram of FIG. 4, at the time of user log-on 80, the key streams are regenerated as described above. When the user requests access to a file, block 82, the system looks to see if a Banner is present, block 84. If no Banner is present, the file is not encrypted, block 86, and access is allowed as indicated by block 88. If a Banner is present, the Key Mix, the Access Check, and the IV fields of the label 30 are decrypted, block 94, under the Mandatory Key Stream, block 95, using the Checksum, block 96, as the initialization vector. After the label has been decrypted, the Label Size, the Key Mix, the Access Check, and the IV are summed, block 98, and compared, block 100, to the label Checksum. If the sum 98 does not equal the Checksum, block 100, the user will be unable to decrypt the file because of tampering, as indicated by block 102. In this case the user must seek assistance from the system Security Manager. If the sum 98 and the Checksum, block 100, are equal, the system looks to see if the Label-is-Present flag is set, block 90. If the Label-is-Present flag is not set, the file is not encrypted, block 92, and access is allowed as indicated by block 88. If the Label-is-Present flag is set, the system computes the user's access code 104 in the same manner as the Access Check was generated during creation of the file. The user's access code 104 is compared to the Access Check of the label 30, as indicated by block 106. If the Access Check does not equal the access code 104, access to the protected file is denied, block 108. If the Access Check equals the access code 104, access to the protected file is granted, block 109. After access to a file has been granted, block 109, all further reads from and writes to the protected file are decrypted and encrypted, block 110, under the keys designated by the Key Mix of the label 30 in a manner that is transparent to the user.

Although the method of the present invention has been described with respect to specific embodiments thereof, it is apparent that various changes and modifications may be suggested to one skilled in the art, and it is intended that the present invention encompass such changes and modifications as fall within the scope of the appended claims.

We claim:

1. A method of cryptographically labeling a data file of electronically stored nonexecutable data, comprising:

generating a file label comprising a first field containing control variables for encrypting and decrypting said data file;
prefixing said label to the file; and
encrypting the file in accordance with the control variables in said first field.

2. The method of claim 1, further comprising:
encrypting said first field of said label in accordance with further control variables in a second field of said label.

3. The method of claim 1, further comprising:
providing a key stream for encrypting and decrypting the data file, wherein said encrypting is accomplished by combining said key stream with said data using a reversible function.

4. A method of labeling and encrypting data file of electronically stored non-executable data, comprising:
generating a file label comprising a first field containing control variables for encrypting and decrpyting the file and a second field containing control variables for encrypting and decrypting said label;
providing a key stream for encrypting and decrypting the file and said label;
prefixing said label to the file;
encrypting the file by combining said key stream with file data using a reversible function in accordance with control variables in said first field of said label; and
encrypting said first field of said label in accordance with instructions in said second field of said label.

5. The method of claim 4, further comprising:
providing identifiers for identifying a computer and an individual user logged-on to the computer; and
placing in said first field of said label a combination of said indentifiers.

6. The method of claim 5, further comprising:
receiving a request for access to the data file from a subsequent user;
decrypting said first field of said label in accordance with control variables in said second field of said label upon receipt of said request for access;
generating an access code from a combination of subsequent identifiers corresponding to said subsequent user;
comparing said access code to the combination of said identifiers in said first field of said label; and
decrypting the file in accordance with the control variables in said first field of said label only if said access code matches the combination of said identifiers in said first field.

7. A method of labeling and controlling access to a file of electronically stored data, comprising:
generating a file label having fields containing control variables for encrypting and decrypting the file and said label, said fields including a label size, a key mix, an access check, an initialization vector, and a checksum;
prefixing said label to the file;
providing identifiers for identifying a computer and each user logged-on to said computer;
deriving said access check from a combination of said identifiers corresponding to a creator of the file;
generating an ID key stream corresponding to each of said identifiers for encrypting and decrypting the file;
providing a mandatory key stream for encrypting and decrypting the file and said label;
obtaining an initial point for each of said key streams from said initialization vector;
encrypting the file by combining said mandatory key stream and each of said ID key streams designated by said key mix with the file data using a reversible function and said initialization vector;
encrypting said key mix, said access check, and said initialization vector using said mandatory key stream initiated at a point designated by said checksum;
storing said encrypted file and encrypted label in said computer;
decrypting said key mix, said access check, and said initialization vector of said label using said mandatory key stream and said checksum in response to a request for access to said file by a user logged-on to said computer;
deriving an access code from said identifiers corresponding to said user;
comparing said access check of said label to said access code of said user; and
decrypting the file using said initialization vector, said reversible function, and said key streams designated by said key mix only if said access check of said label equals said access code of said user.

8. The method of claim 7, wherein the step of providing identifiers comprises:
providing a machine ID for uniquely identifying said computer;
providing a configuration ID for identifying said computer configured in a computer network;
providing a primary ID for uniquely identifying each file creator and user; and
providing a secondary ID for identifying each file creator and user as a member of a particular group.

9. The method of claim 7, further comprising:
providing a plurality of reversible functions for combining said key streams with the file data; and
providing in said initialization vector a designation of one of said plurality of reversible functions for encrypting and decrypting the file.

10. The method of claim 7, further comprising:
deriving said checksum from said label size, said key mix, said access check, and said initialization vector;
obtaining after decryption a sum of said label size, said key mix, said access check, and said initialization vector; and
comparing said sum to said checksum to verify integrity of said label when said sum equals said checksum.

11. The method of claim 8, further comprising:
setting a label-is-present flag in said key mix when said key mix designates at least one of said ID key streams for encryption of the file.

12. The method of claim 11, further comprising:
removing said label-is-present flag from said label of said encrypted file;
transferring the encrypted file to a second computer having the same configuration ID, wherein said transfer is accomplished without further encryption by said second computer; and
resetting said label-is-present flag after transferring said encrypted file.

* * * * *